(12) United States Patent
Markley et al.

(10) Patent No.: US 9,188,202 B2
(45) Date of Patent: Nov. 17, 2015

(54) TENSIONING MECHANISM FOR A CONTINUOUS BELT OR CHAIN DRIVE SYSTEM

(75) Inventors: George L. Markley, Montour Falls, NY (US); Simon Barrette, Lansing, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 260 days.

(21) Appl. No.: 13/696,816

(22) PCT Filed: May 18, 2011

(86) PCT No.: PCT/US2011/036922
§ 371 (c)(1),
(2), (4) Date: Nov. 8, 2012

(87) PCT Pub. No.: WO2011/146564
PCT Pub. Date: Nov. 24, 2011

(65) Prior Publication Data
US 2013/0059686 A1    Mar. 7, 2013

Related U.S. Application Data

(60) Provisional application No. 61/346,999, filed on May 21, 2010.

(51) Int. Cl.
*F16H 7/08* (2006.01)

(52) U.S. Cl.
CPC .......... *F16H 7/08* (2013.01); *F16H 2007/0806* (2013.01); *F16H 2007/0812* (2013.01); *F16H 2007/0874* (2013.01); *F16H 2007/0893* (2013.01)

(58) Field of Classification Search
CPC ..... F16H 2007/0872; F16H 7/08; F16H 7/18; F16H 2007/0804; F16H 2007/0806
USPC ........................................................ 474/111
See application file for complete search history.

(56) References Cited

U.S. PATENT DOCUMENTS 1,581,624 A * 4/1926 Wunderlich et al. ............ 474/87
2,129,107 A    9/1938 Taylor
(Continued)

FOREIGN PATENT DOCUMENTS

DE    2005033322 A1    1/2007
FR       2832358 B1    2/2004
(Continued)

*Primary Examiner* — Henry Liu
(74) *Attorney, Agent, or Firm* — Helmholdt Law PLC; Thomas D. Helmdoldt (57) ABSTRACT

An apparatus (10) for imparting tension to strands of an endless power transferring member loop (12) encircling a drive sprocket (14) and at least one driven sprocket (16 *a*, 16*b*). Two tensioning arms (38*a*, 18*b*) are spaced apart and have guided movement relative to at least one fixed pin (26) with a tension driver (5) operably engaged with one of the tensioning arms (18*a*, 18*b*) for driving both tensioning arms (18*a*, 18*b*) in motion acting through a rotatable, motion transfer body (34) located generally centrally with respect to the endless loop power transferring member (12) for connection to corresponding motion transfer locations (30*a*, 30*b*) associated with the pair of tensioning arms (18*a*, 18*b*), either directly or indirectly. A link assembly (60) can connect first ends (40*a*, 40*b*) to the motion transfer body (34) and second locations (42*a*, 42*b*) to corresponding opposite ends of the two spaced apart tensioning arms (38*a*, 18*b*).

7 Claims, 4 Drawing Sheets

(56) References Cited

U.S. PATENT DOCUMENTS

| | | | |
|---|---|---|---|
| 2,210,276 A * | 8/1940 | Bremer | 474/110 |
| 3,856,101 A | 12/1974 | Allison | |
| 5,967,922 A | 10/1999 | Ullein et al. | |
| 6,106,423 A * | 8/2000 | White et al. | 474/109 |
| 6,322,470 B1 * | 11/2001 | Markley et al. | 474/111 |
| 6,358,169 B1 * | 3/2002 | Markley | 474/111 |
| 6,849,015 B2 | 2/2005 | Markley et al. | |
| 6,955,621 B2 * | 10/2005 | Wigsten et al. | 474/110 |
| 7,097,579 B2 | 8/2006 | Markley | |
| 7,429,226 B2 * | 9/2008 | Tryphonos | 474/111 |
| 7,476,168 B2 | 1/2009 | Markley et al. | |
| 8,066,600 B2 * | 11/2011 | Wigsten et al. | 474/111 |
| 8,608,601 B2 * | 12/2013 | Kim | 474/111 |
| 2002/0160868 A1 * | 10/2002 | Wigsten et al. | 474/101 |
| 2004/0043854 A1 | 3/2004 | Fraley, Jr. et al. | |
| 2006/0270502 A1 * | 11/2006 | Markley et al. | 474/111 |
| 2007/0066428 A1 * | 3/2007 | Tryphonos | 474/111 |
| 2007/0093328 A1 * | 4/2007 | Markley | 474/111 |
| 2009/0143177 A1 | 6/2009 | Nakano et al. | |
| 2009/0264232 A1 | 10/2009 | Bauer et al. | |
| 2009/0275430 A1 * | 11/2009 | Markley | 474/111 |
| 2009/0325749 A1 | 12/2009 | Wigsten | |
| 2009/0325750 A1 | 12/2009 | Wigsten et al. | |

FOREIGN PATENT DOCUMENTS

| | | |
|---|---|---|
| JP | 1985086664 | 6/1985 |
| JP | 1994081921 | 3/1994 |
| JP | 1997144821 | 6/1997 |
| JP | 2002089636 A | 3/2002 |
| JP | 2010502914 | 1/2010 |
| WO | 2005121600 A1 | 12/2005 |
| WO | 2008028023 A2 | 3/2008 |

* cited by examiner

TENSIONING MECHANISM FOR A CONTINUOUS BELT OR CHAIN DRIVE SYSTEM

FIELD OF THE INVENTION

The invention relates to a tensioning system for imparting tension to a power transferring member or chain encircling a driving sprocket and at least one driven sprocket, and more particularly, to a tensioning apparatus that simultaneously tensions multiple strands of the power transferring member or chain.

BACKGROUND

Chain tensioners in engines are used to control the power transmission chains as the chain travels around a plurality of sprockets. The slack of the chain varies as the temperature in an engine increases and as the chain wears. When a chain wears, the chain elongates and the slack in the chain increases. The increase in slack may cause noise, slippage, or tooth jumping between the chain and the sprocket teeth. If the increase of the slack of the chain is not taken up, by a tensioner for example, in an engine with a chain driven camshaft, the engine may be damaged because the camshaft timing is misaligned by several degrees due to slippage or tooth jumping.

Various configurations for closed loop chain tensioner systems are known from U.S. Pat. Nos. 6,955,621; 6,849,015; 6,358,169; 6,322,470; US Published Application No. 2009/0325750; and US Published Application No. 2009/0325749. While each of these configurations is satisfactory for performing its intended function, several of these configurations provide restricted space and location sites for the tensioner driver. It would be desirable to provide a tensioning system that overcomes these limitations, and that provides additional benefits as described below.

SUMMARY

A tensioning system imparts tension to an endless loop power transferring member encircling a drive sprocket and at least one driven sprocket. The system includes a pair of tensioning arms, a centrally located motion transfer body, and a tension driver mechanism. Each of the pair of tensioning arms can have an end for guided movement relative to at least one fixed pin, a link end, and a shoe with a sliding face for tensioning a power transferring member. The motion transfer body can be pivotally fixed to secure the motion transfer body with radially outer locations generally at angularly spaced locations with respect to the axis of rotation of the motion transfer body and, either, somewhat central to and inside the power transferring member, or external to the power transferring member.

The guided movement end of both tensioning arms can be attached to either, a common fixed pivot pin, separate fixed pivot pins, or separate pin and slot combination lost motion assemblies, all generically referred to herein as guided arm movement mechanisms.

In combination with the motion transfer body configuration, a first link member can be pivotally constrained to the motion transfer body at a first end and a second link member can be pivotally constrained to the motion transfer body at a first end, restricting the movement of the first ends of both link members to that defined by the rotational movement of the motion transfer body. The link end of the first tensioning arm can be pivotally attached to a second end of the first link member. The link end of the second tensioning arm can be pivotally attached to a second end of the second link member.

The tension driver mechanism can have a rigidly fixed housing for receiving an outwardly spring biased piston operably engageable with one of the tensioning arms. An end of the piston can be in direct or indirect contact with one of the pivoting tensioning arms for applying force and pivoting movement to the tensioning arm, where the motion of the one tensioning arm driven by the tension driver mechanism transfers motion through the motion transfer body to the other tensioning arm. When the piston of the tension driver mechanism is biased outwards from the housing, the end of the piston applies force to the tensioning arm causing a pivoting moment at the link end of the first tensioning arm, forcing the motion transfer body to pivot or rotate while moving the second tensioning arm toward the power transferring member centerline in a tensioning manner through the angularly spaced, radially outer locations of connection of the motion transfer body to the second tensioning arm.

The angularly spaced, radially outer locations of connection of the motion transfer body to the first and second tensioning arms can be through a combination pin and slot "lost motion" assembly formed in the link ends of the first and second tensioning arms, the second tensioning arm also moves in relation to rotation of the motion transfer body to cause corresponding movement of the second tensioning arm toward the power transferring member centerline, thereby tensioning the power transferring member nearly simultaneously and nearly equally on both strands.

If combined with first and second link members, when the piston of the tension driver mechanism is biased outwards from the housing, the end of the piston applies force to the tensioning arm causing a pivoting moment at the link end of the first tensioning arm, forcing the motion transfer body to pivot or rotate through the first link member connection while moving the second tensioning arm toward the power transferring member centerline in a tensioning manner through the second link member and the angularly spaced, radially outer locations of connection of the motion transfer body to the first and second tensioning arms. Being that the first end of the first link member is pivotally attached to the motion transfer body, the second link member also moves in relation to rotation of the motion transfer body to cause corresponding movement of the second tensioning arm toward the power transferring member centerline, thereby tensioning the power transferring member nearly simultaneously and nearly equally on both strands. The power transferring member, the sprockets, the tension driver mechanism and the spring loading of the tensioning arm shoe can be of any conventional configuration.

Other applications will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

The term "belt" or "chain", as used interchangeably herein, is any power transferring member forming an endless loop and constructed of flexible material or of articulated rigid links to permit the member to conform to a radius of curvature of a pulley or sprocket drive face and intended, in use, to be driven in an endless path; and, by contact with the pulley or sprocket drive face, to transmit power to or extract power from the pulley or sprocket. The term a "pulley" or "sprocket", as used interchangeably herein, is a device rotatable about an axis and having a drive face radially spaced from the axis of rotation for intended power transferring engagement with a belt or chain to drive the belt or chain on an endless path or to extract power from the belt or chain to drive an output load device. The term "guide roll" as used herein is a device rotatable about an axis and having a belt or chain-contacting face radially spaced from the axis of rotation for intended engagement with the belt or chain to aid in directing the belt or chain along an intended path of travel. A guide roll, as distinguished from a pulley or sprocket, is not intended to provide driving power to, or extract power from, a belt or chain. The term. "tensioning arm" as used herein is a member other than a pulley or sprocket engageable with a belt or chain, and which is adjustable or relatively movable with respect to the belt or chain in a direction which causes an increase or decrease in tensile stress in the belt or chain or a take-up or any undesirable belt or chain slack to maintain a desirable drive traction between the belt or chain and the pulley or sprocket drive face. A tensioning arm, as distinguished from a guide roll, has a non-rotatable face portion for contacting the belt or chain, whereby the belt or chain slides over the face portion of the tensioning arm. The term "tension drive mechanism" as used herein applies a force for actuating the multi-strand tensioning arrangement and is derived from or transmitted via mechanical energy, electrical energy, or the exertion of force on a fluid.

Figure 1:
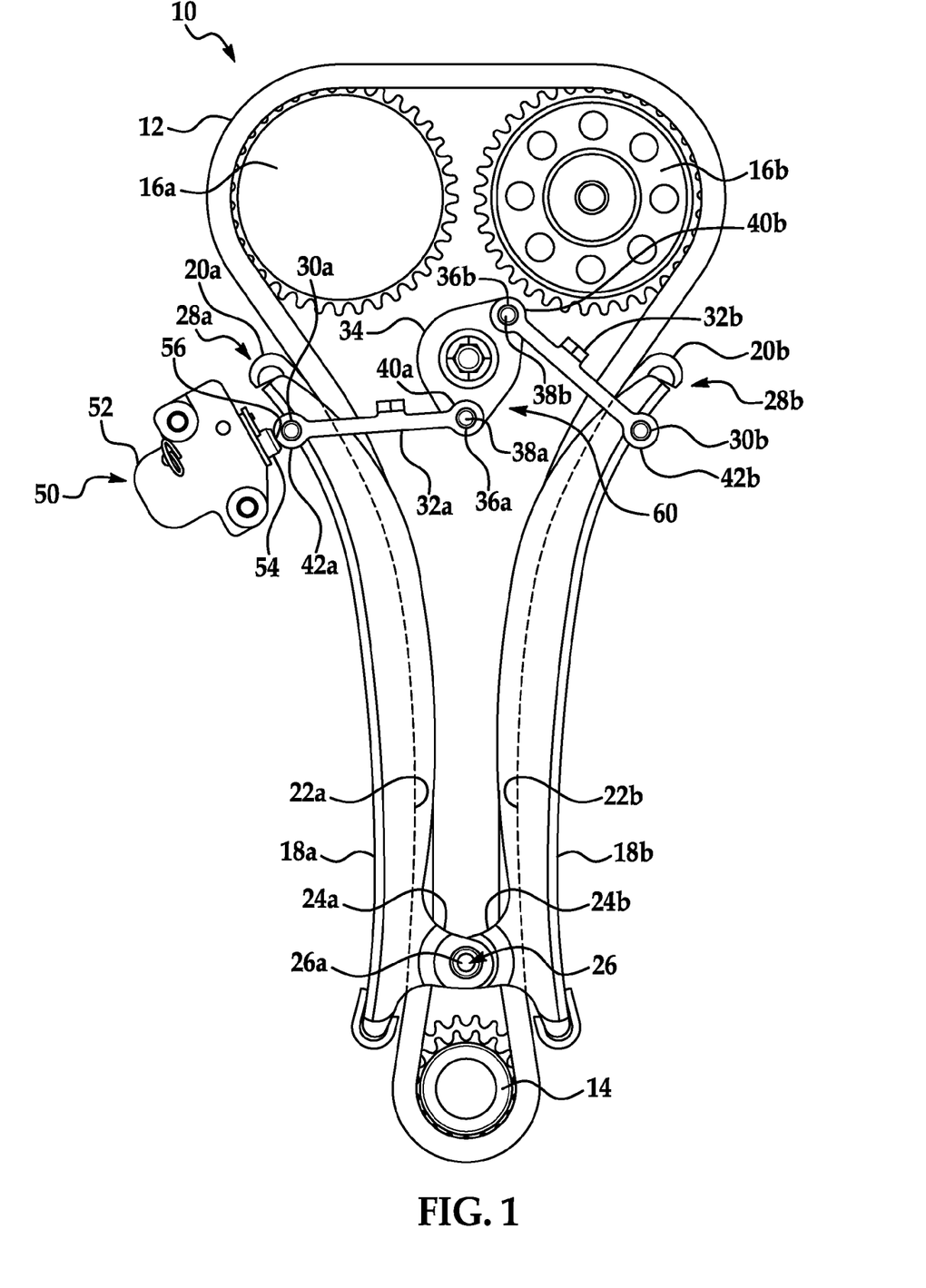
FIG. 1 is a front view of a timing system including a tensioning arrangement having an endless loop of belt or chain, a drive sprocket, at least one driven sprocket, first and second tensioning arms, a tension driver mechanism acting on one of the tensioning arms, and an arm movement guide mechanism including a single fixed pivot pin configuration.
Figure 2:
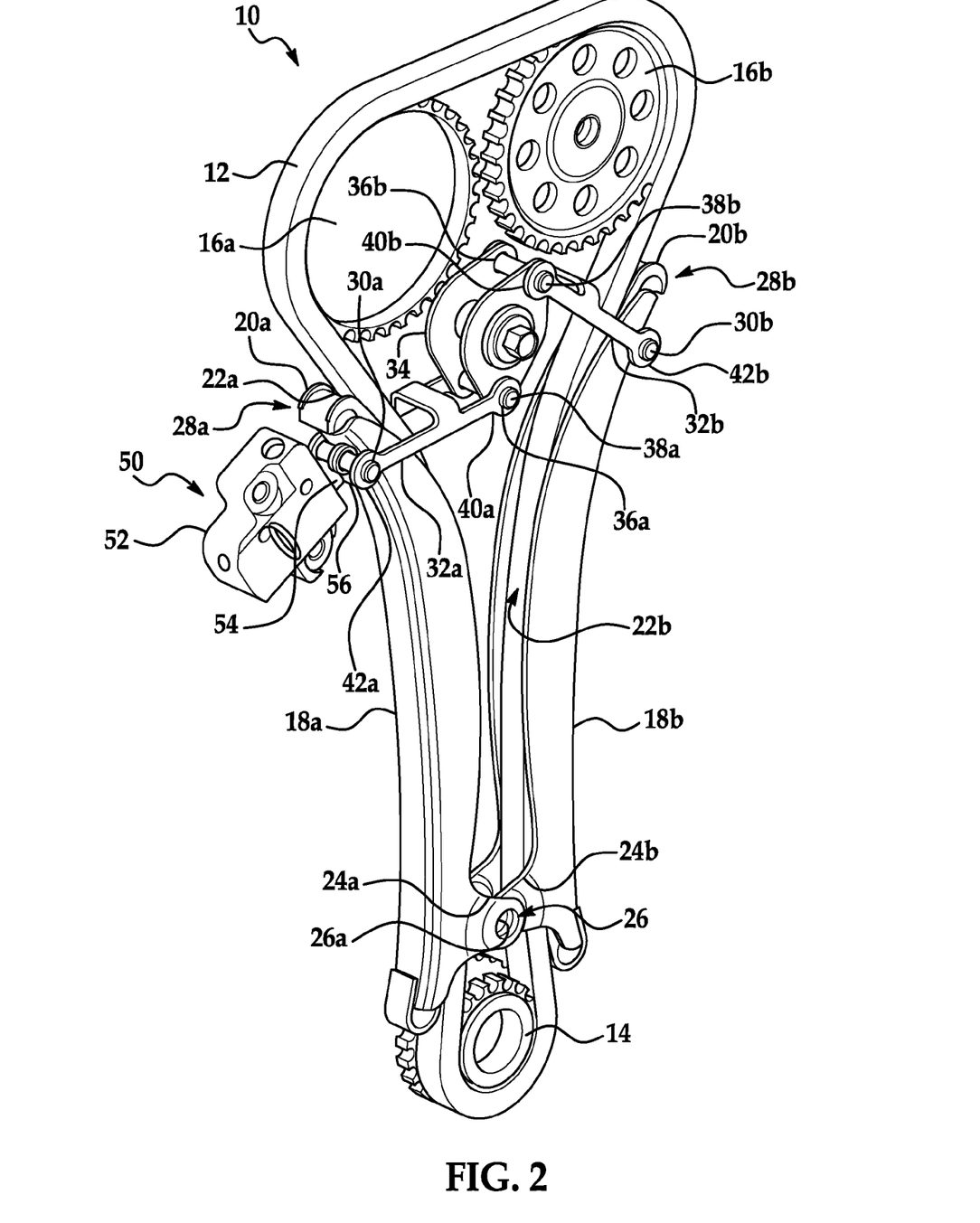
FIG. 2 is a perspective or isometric view of the tensioning arrangement of FIG. 1 with the endless loop of belt or chain, the drive sprocket, the at least one driven sprocket, and the tension driver mechanism, and the first and second tensioning arms.

FIGS. 1-2 illustrate a multi-strand tensioning arrangement or apparatus 10 including an endless loop power transferring member 12, by way of example and not limitation such as a belt or chain, wrapped around a drive sprocket 14 and at least one driven sprocket 16a, 16b supported from a drive shaft and a driven shaft respectively. A guide roll can also be provided if desired. On the outside of both the taut strand and the slack strand of the power transferring member 12 are tensioning arms 18a, 18b. Each of the tensioning arms 18a, 18b can have a compliant face assembly including a wrap-around shoe 20a, 20b with a power-transferring-member-sliding surface 22a, 22b extending along a significant length of the arm. Each shoe 20a, 20b can be spring loaded with a blade type spring positioned within a pocket of the complaint face assembly, if desired. The spring can be located between the tensioning arm 18a, 18b and the corresponding shoe 20a, 20b deforming the shoe away from the tensioning arm.

Figure 3:
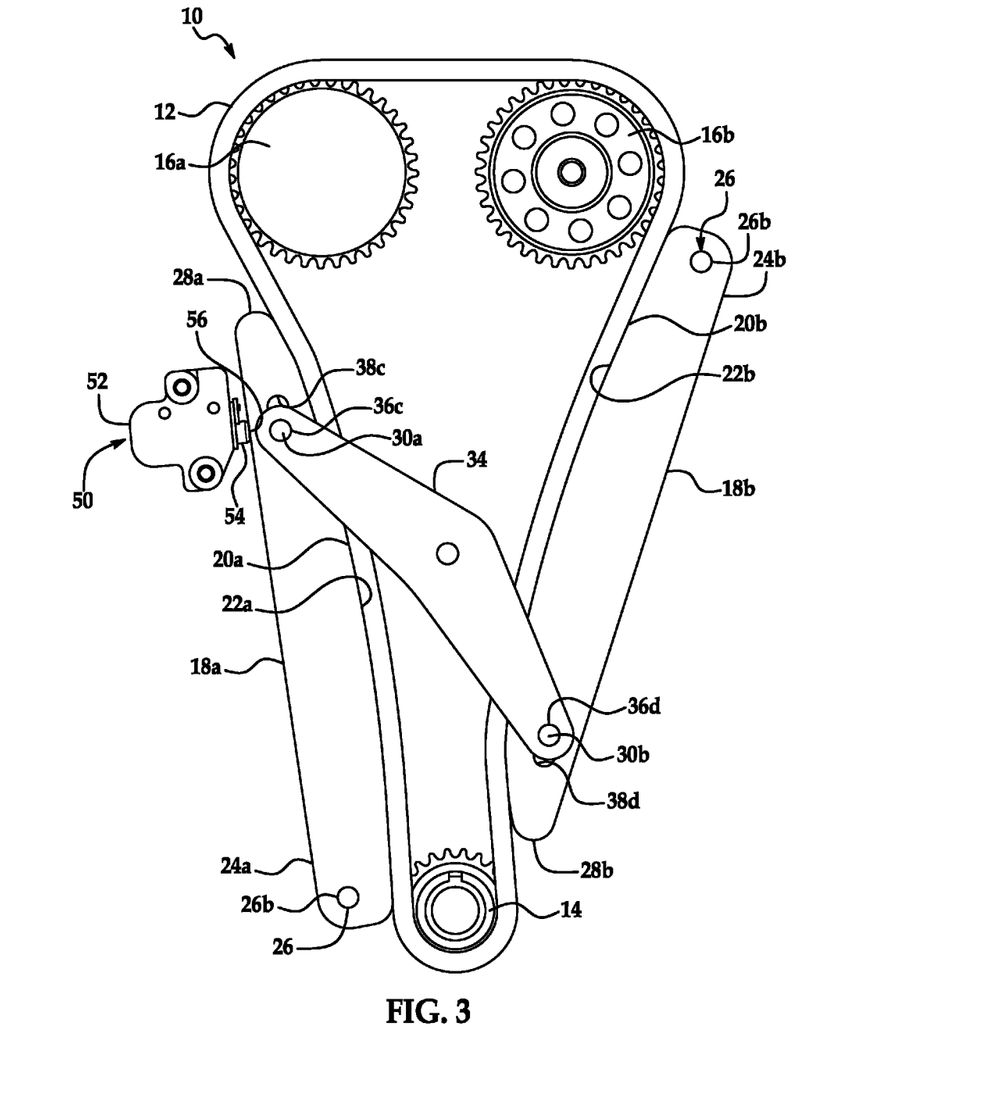
FIG. 3 is a front view of a timing system including a tensioning arrangement having an endless loop of belt or chain, a drive sprocket, at least one driven sprocket, first and second tensioning arms, a tension driver mechanism acting on one of the tensioning arms, an arm movement guide mechanism including a separate dual fixed pivot pin configuration, and a combination slot and pin lost motion assembly formed in the link end of the first and second tensioning arms.
Figure 4:
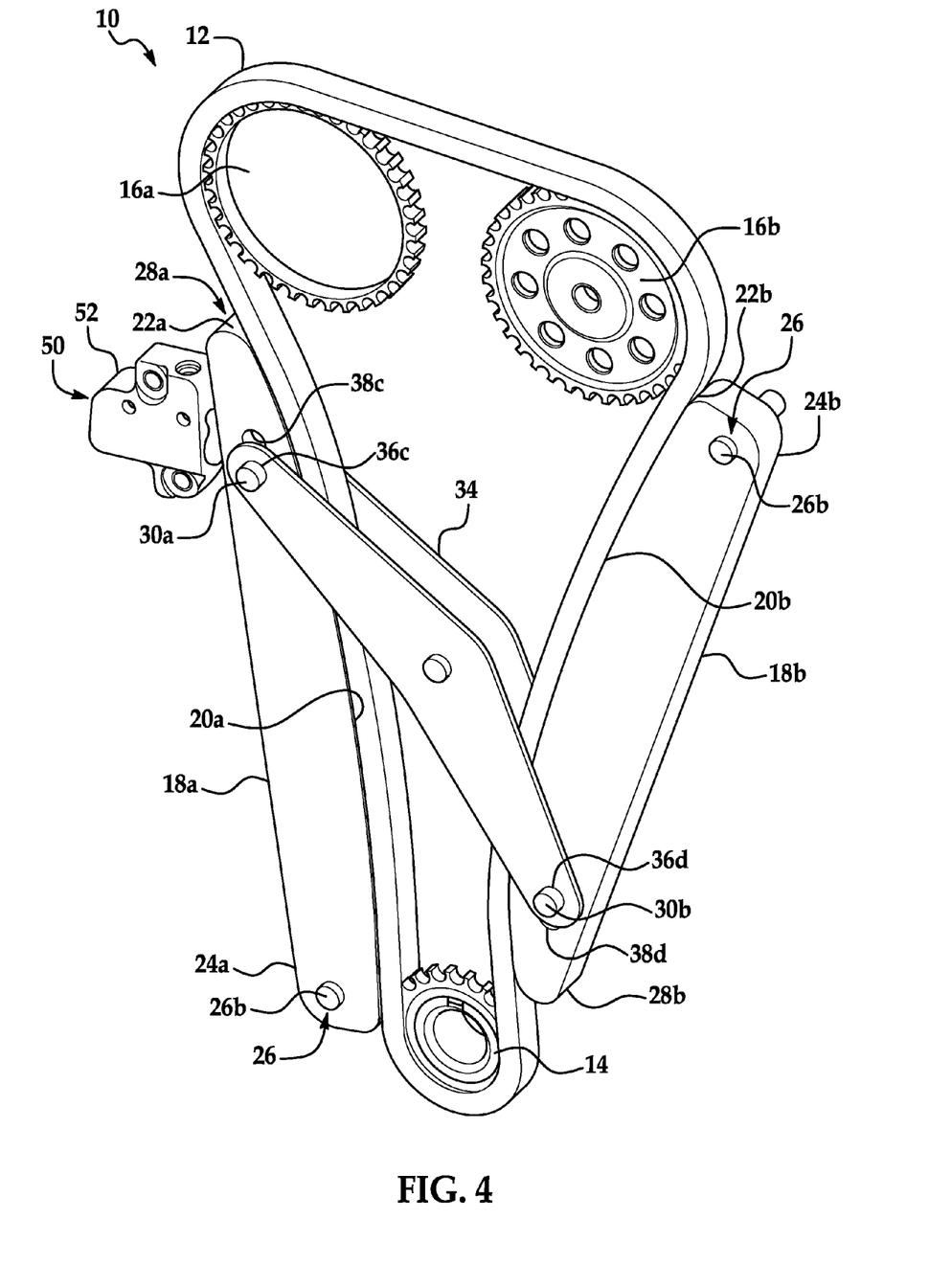
FIG. 4 is a perspective view of a timing system including a tensioning arrangement of FIG. 3 having an endless loop of belt or chain, a drive sprocket, at least one driven sprocket, first and second tensioning arms, a tension driver mechanism acting on one of the tensioning arms, an arm movement guide mechanism including separate dual fixed pivot pin configuration, and a combination slot and pin lost motion assembly formed in the link end of the first and second tensioning arms.

Each of the tensioning arms 18a, 18b has a guided arm movement mechanism 26 for guiding movement of each tensioning arm 18a, 18b along a predetermined path of travel, by way of example and not limitation, such as a pivoting end 24a, 24b for rotation about a fixed pin, which can be a common fixed pivot pin 26a as illustrated in FIGS. 1-2, or which can be dual fixed pins 26b as illustrated in FIG. 3-4, or slot and pin combinations defining at least one lost motion pivot pin (not illustrated). Each of the tensioning arms 18a, 18b can include a link end 28a, 28b with a pin 30a, 30b for attaching link members 32a, 32b that are free to rotate with the pins 30a, 30b located outside the power transferring member strands between the drive sprocket 14 and the at least one driven sprocket 16a, 16b. The power transferring member 12, the drive sprocket 14, the driven sprockets 16a, 16b, the tension driver mechanism 50, and spring loading of the tensioning arm shoes 20a, 20b can be of any desired conventional configuration.

A motion transfer body 34 with radially outer, angularly spaced pin locations 36a, 36b can be located inside the power transferring member strands, and preferably along a power transferring member centerline (i.e. a line spaced equidistant between the two strands of the power transferring member). The motion transfer body 34 can be located generally between the drive sprocket 14 and at least one driven sprocket 16a, 16b, and generally central to and inside of the endless loop power transferring member 12 as best seen in FIGS. 1-4. The first link member 32a can include a first end 40a having a pivot pin 38a pivotally connected to the motion transfer body 34 at one of the pin locations 36a, and the second link member 32b can include a first end 40b pivotally connected to the motion transfer body 34 at another of the pin locations 36b, restricting movement of both first ends 40a, 40b of the first and second link members 32a, 32b to that defined by rotation of the motion transfer body 34.

As illustrated in FIGS. 1-2, the link end 28a of the first tensioning arm 18a can be pivotally attached to a pivot position 42a of the first link member 32a. The pivoting ends 24a, 24b of both tensioning arms 18a, 18b can be pivotally attached to an arm movement guide mechanism 26, such as a common fixed pivot pin 26a as illustrated in FIGS. 1-2. The link end 28b of the second tensioning arm 18b can be pivotally attached to the second end 42b of the second link member 32b.

The tension driver mechanism 50 can have a rigidly fixed housing 52 for receiving an outwardly spring biased piston 54 with an end 56 operably engaged, or connected to, directly or indirectly, such as in contact with one of the tensioning arms 18a, 18b as illustrated in FIGS. 1-4. When the piston 54 of the tension driver mechanism 50 is biased outwards from the fixed housing 52, the end 56 of the piston 54 applies force to the corresponding operably engaged tensioning arm 18a, 18b to create a pivoting moment at the link end of the first arm 18a, forcing the first end 40a of the first link member 32a to rotate the motion transfer body 34 while moving the first tensioning arm 18a toward the power transferring member centerline in a tensioning manner. Being that the first end 40b of the link member 32b is pivotally attached to the motion transfer body 34, the link member 32b also moves with rotation of the motion transfer body 34 and moves the second tensioning arm 18*b* toward the power transferring member centerline thereby tensioning the power transferring member 12 nearly simultaneously and nearly equally on both strands.

The first and second tensioning arms 18*a*, 18*b* can each have a pivot end 24*a*, 24*b* for rotation about a common fixed pivot pin 26*a* as illustrated in FIGS. 1-2, or separate fixed pivot pins 26*b* as illustrated in FIGS. 3-4, a link end 28*a*, 28*b* for connecting to motion transfer body 34, and a shoe 20*a*, 20*b* with a face for sliding contact with a power transferring member 12. As illustrated in FIGS. 1-2, the link end 28*a*, 28*b* can be pivotally connected to corresponding first and second link member 32*a*, 32*b* at one end 42*a*, 42*b* and connect to the motion transfer body 34 at radially outer, angularly spaced pin locations 36*a*, 36*b* at corresponding opposite ends 40*a*, 40*b* of the first and second link members 32*a*, 32*b*. As illustrated in FIGS. 3-4, the link ends 28*a*, 28*b* of the first and second tensioning arms 18*a*, 18*b* can be directly connected to corresponding radially outer, angularly spaced pin locations 36*c*, 36*d* associated with the motion transfer body 34 for receiving pins 30*a*, 30*b* through slots 38*c*, 38*d* formed in the corresponding first and second tensioning arms 18*a*, 18*b*.

A tension driver mechanism 50 can include a piston 54 biased outwardly from a fixed housing 52 by a spring, a pressurized fluid, or any combination thereof, for operable engagement with one of the tensioning arms 18*a*, 18*b*. A blade type spring can be applied within the tensioning arm 18*a*, 18*b* between the arm body and the shoe 20*a*, 20*b* to provide supplemental tensioning as needed. A continuous belt or chain 12 can encircle a drive pulley or sprocket 14 and at least one driven pulley or sprocket 16*a*, 16*b*. A drive pulley or sprocket 14 can fix one part of a path of the continuous endless loop power transferring member 12. At least one driven sprocket 16*a*, 16*b* can fix another part of the path of the continuous endless loop power transferring member 12.

The tension driver mechanism 50 can provide the source of force that causes the primary tensioning of the power transferring member 12. The tensioning force can be applied to one of the tensioning arms 18*a*, 18*b*, either directly or indirectly. Any movement of one of the tensioning arms 18*a*, 18*b* creates a pivoting motion at the corresponding link end 28*a*, 28*b*. The pivoting motion of one of the tensioning arms 18*a*, 18*b* causes rotation of the motion transfer body 34, such as a result of the motion transfer body 34 being driven by the first end 40*a* of the first link member 32*a* by inward movement of the link end 28*a* of the first tensioning arm 18*a*. Rotation of the motion transfer body 34 causes corresponding movement of the link end 28*b* of the second tensioning arm 18*b* through the connected first and second ends 40*b*, 42*b* of the second link member 32*b*. The inward movement of the link ends 28*a*, 28*b* of the first and the second tensioning arms 18*a*, 18*b* causes tensioning of the power transferring member 12. The motion transfer body 34 limits the motion of the first ends 40*a*, 40*b* and the clocking of the driven sprockets 16*a*, 16*b*.

The tension driver mechanism 50 can be located outside of the endless loop power transferring member 12 to operably engage one of the tensioning arms 18*a*, 18*b*. The tension driver mechanism force can be applied to position the tensioning arm of one strand, preferentially with the other tensioning arm following. A spring loaded shoe 20*a*, 20*b* in the tensioning arm 18*a*, 18*b* can provide for localized strand tensioning, supplementing the limited tensioning arm 18*a*, 18*b* motion due to the two tensioning arms 18*a*, 18*b* being linked together, or for an intentionally softened tensioner spring. Spring loading of the tensioning shoe is optional, if desired.

The tension driver mechanism 50 can be located on an opposite side from that illustrated in FIGS. 1-4, i.e. these elements can swap sides in order to locate the tension driver mechanism on either the tight strand side or the slack strand side. The tension driver mechanism 50 can be hydraulic with damping and a ratchet, or with just a spring (no hydraulics) and/or no ratchet. The arm movement guide mechanism 26 can include one common arm pivot pin 26*a* located near the drive sprocket inside the power transferring member loop as illustrated in FIGS. 1-2, or alternatively two individual arm pivot pins 26*b* can be located near opposite sprockets outside the power transferring member loop as illustrated in FIGS. 3-4, or alternatively pin and slot combinations defining a lost motion pivot pin can be provided (not illustrated). Additional driven sprockets to those illustrated in FIGS. 1-4 can also be added, if desired.

Referring now to FIGS. 3-4, it should also be recognized that two individual arm pivot pins 26*b* can be located near opposite sprockets outside the power transferring member loop, if desired. One of the tensioning arms 18*a*, 18*b* can be inverted so that one of the pivoting ends 24*a*, 24*b* of the tensioning arms 18*a*, 18*b* can be located near the cam or driven sprockets 16*a*, 16*b*, while another of the pivoting ends 24*a*, 24*b* can be located near the drive sprocket 14. It should also be recognized that the blade type spring between the body of the tensioning arms 18*a*, 18*b* and the corresponding shoes 20*a*, 20*b* could be eliminated, eliminating the compliant face assembly. The multi-strand tensioning arrangement 10 can be used for any drive with a drive pulley or sprocket 14 and at least one driven pulley or sprocket 16*a*, 16*b*.

A power transmission system using such a multi-strand tensioning arrangement 10 can include a drive sprocket 14 and at least one driven sprocket 16*a*, 16*b* wrapped by a continuous power transferring member 12, by way of example and not limitation such as a chain or belt loop that is flanked by a pair of arms 18*a*, 18*b* having a shoe 20*a*, 20*b* with a wear surface facing inward toward the sprockets and in contact with the tight and slack strands of the power transferring member loop. Each arm 18*a*, 18*b* can have an arm movement guide mechanism 26, by way of example and not limitation such as an anchoring pivot 26*a* at one end, possibly common with the other arm as illustrated in FIGS. 1-2 but not necessarily so as illustrated in FIGS. 3-4, and an optional link assembly for making a connection through link members 32*a*, 32*b* to one another through the motion transfer body 34 as illustrated in FIGS. 1-2. A tension driver mechanism 50 can provide force to move one of the arms 18*a*, 18*b*, either directly or indirectly, while the other arm follows this movement through action of the motion transfer body 34 individually as illustrated in FIGS. 3-4, or in combination with the link members 32*a*, 32*b* constrained for movement with respect to the motion transfer body 34 as illustrated in FIGS. 1-2. The motion transfer body 34 can be pivotally located somewhat central to the inside of the power transferring member 12. The shoes 20*a*, 20*b* of the tensioning arms 18*a*, 18*b* are located outside the loop of power transferring member 12.

The tension driver mechanism 50 can include an outwardly spring biased piston 54 extending outwardly from a rigidly fixed housing 52, drawing the tensioning arms 18*a*, 18*b* together towards the power transferring member centerline, tensioning or squeezing the power transferring member strands between the tensioning arms 18*a*, 18*b* equally and simultaneously. By linking the tensioning arms 18*a*, 18*b* together the vibrations of one power transferring member strand is linked to the other power transferring member strand and the vibrations are generally neutralized. By linking the tensioning arms 18*a*, 18*b* together to a single tension driver mechanism 50, the force is divided equally between both tensioning arms 18a, 18b when the strands are equal. Since the tensioning arms 18a, 18b are connected, if one strand of the power transferring member tightens, the other strand slackens. The total tensioning force is applied to resist the tightening strand.

The multi-strand tensioning arrangement also allows for the additional tensioning necessary to tension a worn, elongated power transferring member 12. Since the tensioning arms 18a, 18b are connected and tensioning the power transferring member strand is equal and simultaneous between the two tensioning arms 18a, 18b, the increase in power transferring member length is equally absorbed in each power transferring member strand, maintaining the timed relationship of the drive sprocket 14 and driven sprockets 16a, 16b throughout the life of the power transferring member, eliminating the need to compensate for the change in sequential timing due to power transferring member elongation and enhancing the engine performance over its lifetime. To tension an elongated, worn power transferring member 12, the tension driver mechanism 50 can be activated to extend outwards from the rigidly fixed housing 52, causing the opposing tensioning arms 18a, 18b to be drawn further in toward the power transferring member centerline and the pivotal motion transfer body 34, squeezing or tensioning the slack and taut strand portions of the power transferring member 12 simultaneously and nearly equally.

Referring now to FIGS. 3-4, a multi-strand tensioning arrangement or apparatus 10 can include an endless loop power transferring member 12, by way of example and not limitation such as a belt or chain, wrapped around a drive sprocket 14 and at least one driven sprocket 16a, 16b supported from a drive shaft and a driven shaft respectively. A guide roll can also be provided if desired. On the outside of both the taut strand and the slack strand of the power transferring member 12 are tensioning arms 18a, 18b. Each of the tensioning arms 18a, 18b can have a compliant face assembly including a wrap around shoe 20a, 20b with a power-transferring-member-sliding surface extending along a significant length of the arm. Each shoe 20a, 20b can be spring loaded with a blade type spring positioned within a pocket of the complaint face assembly, if desired. The spring can be located between the tensioning arm 18a, 18b and the corresponding shoe 20a, 20b deforming the shoe away from the tensioning arm. Each of the tensioning arms 18a, 18b has an arm movement guide mechanism 26, by way of example and not limitation, such as a pivoting end 24a, 24b for rotation about a fixed pin, which can be a common fixed pivot pin 26a illustrated in FIGS. 1-2, or a dual fixed pivot pin 26b illustrated in FIGS. 3-4, or a slot and pin combination not shown. Each of the tensioning arms 18a, 18b includes a link end 28a, 28b with slots 38c, 38d formed respectively therein for receiving corresponding pins 30a, 30b located outside the power transferring member 12 strands between the drive sprocket 14 and the at least one driven sprocket 16a, 16b. The power transferring member 12, the drive sprocket 14, the driven sprockets 16a, 16b, the tension driver mechanism 50, and spring loading of the tensioning arm shoes can be of any desired conventional configuration. Inside the power transferring member strands, and preferably along a power transferring member centerline (i.e. a line spaced equidistant between the two strands of the power transferring member), is a pivotal motion transfer body 34 defining radially outer, angularly spaced pin locations 36c, 36d located generally between the drive sprocket 14 and at least one driven sprocket 16a, 16b. The motion transfer body 34 is located generally central to and inside of the endless loop power transferring member 12. The tension driver mechanism 50 can have a rigidly fixed housing 52 for receiving an outwardly spring biased piston 54 with an end 56 in contact with one of the tensioning arms 18a, 18b. When the piston 54 of the tension driver mechanism 50 is biased outwards from the fixed housing 52, the end 56 of the piston 54 applies force to one of the tensioning arms 18a, 18b for driving both tensioning arms 18a, 18b in movement, forcing the pivot pin 30a to move within the slot 38c of the tensioning arm 18a while rotating the motion transfer body 34 and moving the first tensioning arm 18a toward the power transferring member centerline in a tensioning manner. Being that the pivot pin 30b is engaged with the slot 38d of tensioning arm 18b, the motion transfer body 34 also moves the pivot pin 30b in the slot 36 and moves the second tensioning arm 18b toward the power transferring member centerline thereby tensioning the power transferring member 12 nearly simultaneously and nearly equally on both strands.

A drive sprocket 14 and at least one driven sprocket 16a, 16b can be wrapped by a continuous chain loop 12 that provides reasonable slack on both sides. Two pivoting tensioning arms 18a, 18b can be located outside the chain loop 12 with friction surfaces 20a, 20b facing inward toward the chain 12 and pivoting ends 24a, 24b extending across the chain 12 inward to a common pivot 26a near the drive sprocket 14 and inside the chain loop 12. The two tensioning arms 18a, 18b can be connected through an anchored rotating member or motion transfer body 34, positioned on or near a center line described by the chain loop 12 and near the at least one driven sprocket 16a, 16b, in a manner that forces the arms 18a, 18b to act together. If one tensioning arm 18a, 18b is forced to move inward the other tensioning arm 18b, 18a is brought along forcibly and also moves inward. The rotating member or motion transfer body 34 can move counter clockwise to pull the tensioning arms 18a, 18b together, therefore pin receiving aperture 36a and pin receiving aperture 36b in the rotating motion transfer body 34 are near equidistant from the pivot axis and somewhat opposite from one another. The pin receiving aperture 36b can be positioned closest to the driven sprockets 16a, 16b and to the right of the loop centerline as illustrated in FIGS. 1-2. By way of example and not limitation, as illustrated in FIGS. 1-2, an end 42a of link member 32a can be pivotally attached to the swinging end 28a of the (left) slack strand tensioning arm 18a. An end 40a of link member 32a can be pivotally attached to the pin receiving aperture 36a of the rotating motion transfer body 34 through pin 38a. An end 42b of link member 32b can be pivotally attached to the moving end 28b of the tight strand tensioning arm 18b. An end 40b of link member 32b can be pivotally attached to the pin receiving aperture 36b of the rotating motion transfer body 34 through pin 38b. If either tensioning arm 18a, 18b is forced inward removing slack from the corresponding chain strand the other tensioning arm 18b, 18a likewise tensions the opposite correspondingly engaged chain strand.

A power transmission system using such a tensioning arrangement 10 can include a drive sprocket 14 and at least one driven sprocket 16a, 16b wrapped by a continuous chain loop 12. A pair of tensioning arms 18a, 18b, each having a shoe 20a, 20b with a wear surface facing inward toward the sprockets 14, 16, 16b and in contact with the strands of the chain loop 12, flank the chain. Each arm 18a, 18b can have an anchoring pivot 26 at one end 24a, 24b, common with the other arm or not, and means for making a connection through motion transfer body 34, or through a combination with link members 32a, 32b to one another at the other end such that when one arm 18a, 18b tensions so does the other arm 18b, 18a. A tensioner body 50 can be fixed so that a piston 54 can apply a tensioning force to one or the other tensioning arms 18a, 18b. A tensioning arrangement 10 can include a rotating motion transfer body 34 pivotally fixed near midway between the non-pivoting ends 28a, 28b of the tensioning arms 18a, 18b and having a pin receiving aperture 36a and a pin receiving aperture 36b near equidistant from a pivot axis of the motion transfer body 34 and somewhat opposite one another. Two pins 38a, 38b constrained to pin receiving apertures 36a, 36b can be pivotally attached to a first end 40a, 40b of at least two link pieces 32a, 32b. The two tensioning arms 18a, 18b can be located nearly symmetrically outside the chain loop 12 with the shoes 20a, 20b facing inward and in contact with the chain back. The pivoting ends 24a, 24b of both arms 18a, 18b can be attached to a, common to both arms, fixed pin 26a positioned inside the chain loop 12 near the drive sprocket 14. At least two link pieces 32a, 32b, of near equal length, can each have a first and a second pin receiving aperture in opposite ends 40a, 40b, 42a, 42b. The second end 42a of the first link piece 32a can be pivotally pinned to a swinging end 28a of the first tensioning arm 18a, by way of example and not limitation, i.e. the slack strand arm, and the first end 40a can be pivotally pinned to the pin receiving aperture 36a through pin 38a to the motion transfer body 34, so that when the rotating motion transfer body 34 rotates counter clockwise, the arm 18a can be pulled inward. The second end 42b of the second link piece 32b can be pivotally pinned to a swinging end 28b of the second tensioning arm 18b and the first end 40b can be pivotally pinned to the pin receiving aperture 36b through pin 38b to the motion transfer body 34, so that when the rotating motion transfer body 34 rotates counter clockwise the tensioning arm 18b can be pulled inward. A tensioner 50 with a piston 54, biased outward by a spring force from a fixed body 52, can be located so that the piston 54 is in contact with one of the tensioning arms 18a, 18b near the second end 42a of the link piece 32a. Any responding inward motion at the link end 42a of the tensioning arm 18a results in a counter clockwise rotation of the rotating motion transfer body 34 and a likewise inward motion of the link end 42b of the tensioning arm 18b, removing slack and tensioning the chain loop 12. The design benefits can include the rotating motion transfer body 34 can be pivotally fixed thereby restricting cam sprocket clocking by restricting the unitized swing of the two tensioning arms 18a, 18b about the corresponding pivot pin 26a. This configuration allows increased freedom of tensioner 50 location.

In summary, an apparatus 10 imparts tension to multiple strands of a power transferring member 12 forming an endless loop to conform to a radius of curvature of spaced apart devices 14, 16a, 16b rotatable about respective spaced apart axes. Each device 14, 16a, 16b has a drive face radially spaced from the respective spaced apart axes of rotation for intended power transferring engagement of the power transferring member 12 between the spaced apart devices 14, 16a, 16b. The apparatus includes two tensioning arms 18a, 18b spaced apart from one another at respective outer ends 28a, 28b for pivoting movement independent of one another. The two tensioning arms 18a, 18b support inwardly facing shoes 20a, 20b with power-transferring-member-sliding faces 22a, 22b. A link assembly 60 includes at least two link members 32a, 32b pivotally connected to one another at respective first ends 40a, 40b through pins 38a, 38b to motion transfer body 34. The connected first ends 40a, 40b are constrained for limited movement with the rotatable motion transfer body 34 fixed for pivoting movement at a location generally along a centerline of the endless loop 12 between the spaced apart devices 14, 16a, 16b. At least two link members 32a, 32b can be pivotally connected individually to outer ends 28a, 28b of opposite ones of the two spaced apart tensioning arms 18a, 18b at second locations 42a, 42b spaced from the first ends 40a, 40b. A tension driver 50 can drive the link assembly 60 and connected tensioning arms 18a, 18b in motion for tensioning the power transferring member 12 nearly simultaneously and nearly equally on both strands.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tensioning system (10) for imparting tension to an endless loop power transferring member (12) encircling a drive sprocket (14) and at least one driven sprocket (16a, 16b) comprising:

a pair of tensioning arms (18a, 18b), each tensioning arm having a guided arm movement mechanism (26), a motion transfer location (30a, 30b) and a shoe (20a, 20b) with a power-transferring-member-sliding face (22a, 22b), each guided arm movement mechanism having a separate fixed pivot pin (26b) connected to the pivot of each tensioning arm (18a, 18b) located outside the endless loop power transferring member (12);

a monolithic rotatable, motion transfer body (34) located generally centrally with respect to the endless loop power transferring member (12) for connection to corresponding motion transfer locations (30a, 30b) associated with the pair of tensioning arms (18a, 18b), the motion transfer locations (30a, 30b) located distally opposite with respect to one another such that the two tensioning arms rotate in a common rotational direction during tensioning actuation and a tension driver (50) located outside of the endless loop power transferring member (12) and operably engaging one of the pair of tensioning arms (18a, 18b) for driving both of the pair of tensioning arms (18a, 18b) relative to one another.

2. The tensioning system (10) of claim 1, wherein the rotatable, motion transfer body further comprises:

first and second pin locations (36c, 36d) on the motion transfer body (34) located external with respect to the endless loop power transferring member (12) and directly connected to corresponding motion transfer locations (30a, 30b) of the pair of tensioning arms (18a, 18b).

3. The tensioning system (10) of claim 1, wherein the motion transfer locations (30a, 30b) are defined by slots (38c, 38d) formed in the pair of tensioning arms (18a, 18b).

4. An apparatus (10) for imparting tension to multiple strands of an endless loop power transferring member (12) to conform to a radius of curvature of spaced apart devices (14, 16a, 16b) rotatable about respective spaced apart axes of rotation, and each device (14, 16a, 16b) having a drive face radially spaced from an axis of rotation for intended power transferring engagement of the endless loop power transferring member (12) between the spaced apart devices (14, 16a, 16b), the apparatus comprising:

two tensioning arms (18a, 18b) spaced apart from one another at respective outer ends (28a, 28b) for guided movement independent of one another, the two tensioning arms (18a, 18b) including corresponding motion transfer locations (30a, 30b) at respective outer ends (28a, 28b) located distally opposite with respect to one another, such that the two tensioning arms rotate in a common rotational direction during tensioning actuation, the two tensioning arms (18a, 18b) supporting inwardly facing shoes (20a, 20b) with power-transferring-member-sliding faces (22a, 22b), the motion transfer locations (30a, 30b) defined by slots (38c, 38d) formed in the pair of tensioning arms (18a, 18b) and located distally opposite with respect to one another;

a rotatable, motion transfer body (34) located generally centrally with respect to the endless loop power transferring member (12) for connection to the corresponding motion transfer locations (30a, 30b) associated with the two tensioning arms (18a, 18b); and a tension driver (50) located outside of the endless loop power transferring member (12) and operably engaging one of the two tensioning arms (18a, 18b) for driving both of the two tensioning arms (18a, 18b) relative to one another.

5. The apparatus of claim 4 further comprising:

a guided arm movement mechanism (26) having at least one fixed pivot pin (26a, 26b) for supporting the two tensioning arms (18a, 18b) for independent movement with respect to one another.

6. The apparatus of claim 5, wherein the guided arm movement mechanism (26) for each tensioning arm (18a, 18b) further comprises:

a separate fixed pivot pin (26b) connected to each of the tensioning arms (18a, 18b) located outside the endless loop power transferring member (12) for guiding movement of each tensioning arm along a predetermined path of travel.

7. In an apparatus (10) for imparting tension to multiple strands of an endless loop power transferring member (12) to conform to a radius of curvature of spaced apart devices (14, 16a, 16b) rotatable about respective spaced apart axes of rotation, and each device (14, 16a, 16b) having a drive face radially spaced from an axis of rotation for intended power transferring engagement of the endless loop power transferring member (12) between the spaced apart devices (14, 16a, 16b), two tensioning arms (18a, 18b) spaced apart from one another at respective outer ends and pivotally connected at inner ends (24a, 24b) for independent rotation about at least one guided arm movement mechanism (26), the two tensioning arms (18a, 18b) supporting inwardly facing shoes (20a, 20b) with power-transferring-member-sliding faces (22a, 22b), the improvement comprising:

a monolithic rotatable, motion transfer body (34) located generally centrally with respect to the endless loop power transferring member (12) for connection to corresponding motion transfer locations (30a, 30b) associated with the two tensioning arms (18a, 18b), the motion transfer body (34) extending outwardly outside of the endless loop power transferring member (12) to engage the motion transfer locations (30a, 30b) defined by slots (38c, 38d) formed in the two tensioning arms (18a, 18b); and a tension driver (50) located outside the endless loop power transferring member (12) and operably engaged with one of the two tensioning arms (18a, 18b) for driving both of the tensioning arms (18a, 18b) in motion for tensioning the endless loop power transferring member (12) nearly simultaneously and nearly equally on both strands.

\* \* \* \* \*